(12) United States Patent
Dietrich

(10) Patent No.: US 7,234,493 B2
(45) Date of Patent: Jun. 26, 2007

(54) DEVICE AND METHOD FOR TRANSFERRING A DUSTY POWDERY GRAIN-LIKE OR GRANULAR CONVEYED MATERIAL OUT OF A STORAGE RECEPTACLE AND INTO A WORKING OR TRANSFER RECEPTACLE OR A SIMILAR ACCOMODATING SPACE

(75) Inventor: Frédéric F. Dietrich, Le Mont Pélerin (CH)

(73) Assignee: Frederich Dietrich, Jr., Morrens (CH)

( * ) Notice: Subject to any disclaimer, the term of this patent is extended or adjusted under 35 U.S.C. 154(b) by 216 days.

(21) Appl. No.: 10/488,802

(22) PCT Filed: Sep. 6, 2002

(86) PCT No.: PCT/EP02/09989

§ 371 (c)(1),
(2), (4) Date: Sep. 22, 2004

(87) PCT Pub. No.: WO03/022718

PCT Pub. Date: Mar. 20, 2003

(65) Prior Publication Data

US 2005/0019107 A1    Jan. 27, 2005

(30) Foreign Application Priority Data

Sep. 10, 2001 (DE) .................. 101 44 528
Dec. 13, 2001 (DE) .................. 101 61 281
Feb. 27, 2002 (DE) .................. 102 08 316
Jul. 26, 2002 (DE) .................. 102 34 013

(51) Int. Cl.
    *B65B 1/04* (2006.01)
(52) U.S. Cl. .......................... 141/67; 141/71
(58) Field of Classification Search ............... 141/67, 141/70–81, 98; 222/450
    See application file for complete search history.

(56) References Cited

U.S. PATENT DOCUMENTS 3,260,285 A * 7/1966 Vogt .......................... 141/8
3,788,368 A * 1/1974 Geng et al. ............... 141/67
5,275,215 A * 1/1994 Derby ....................... 141/67

FOREIGN PATENT DOCUMENTS

| BE | 658 419 | 2/1965 |
| CH | 157 807 | 10/1932 |
| DE | 39 41 735 | 6/1991 |
| DE | 41 13 285 | 10/1992 |
| DE | 196 54 648 | 4/1998 |

* cited by examiner

Primary Examiner—Steven O. Douglas
(74) Attorney, Agent, or Firm—Bachman & LaPointe, P.C.

(57) ABSTRACT

A device for transferring a dusty, powdery, grain-like or granular conveyed material out of a storage receptacle and into a working or transfer receptacle or a similar accommodating space. The device comprises a working chamber, which is connected to a supply line for the conveyed material, and comprises a discharge cross-section. At least one feed line for a flow medium leads into the working chamber, and a filter device is located between the flow medium and the conveyed material. The supply line for the conveyed material leads into a tubular filter space, and a filter insert, which is also tubular and delimits said filter space, is placed inside the working chamber connected to an air line and/or to a gas line.

40 Claims, 4 Drawing Sheets

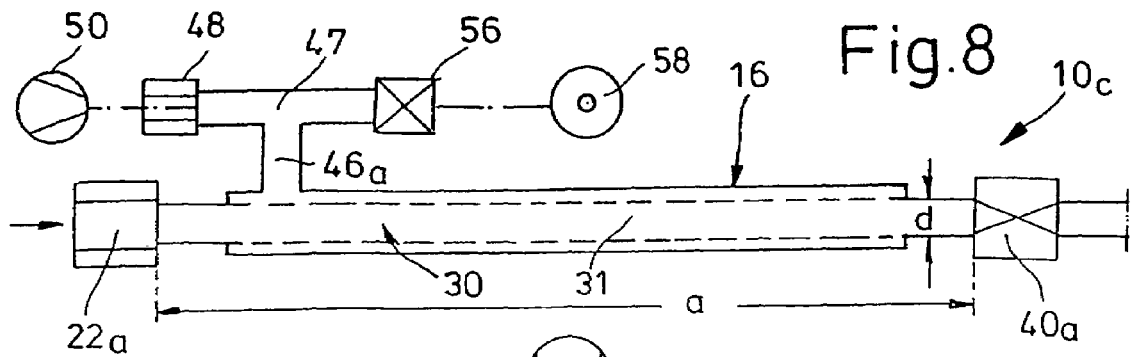
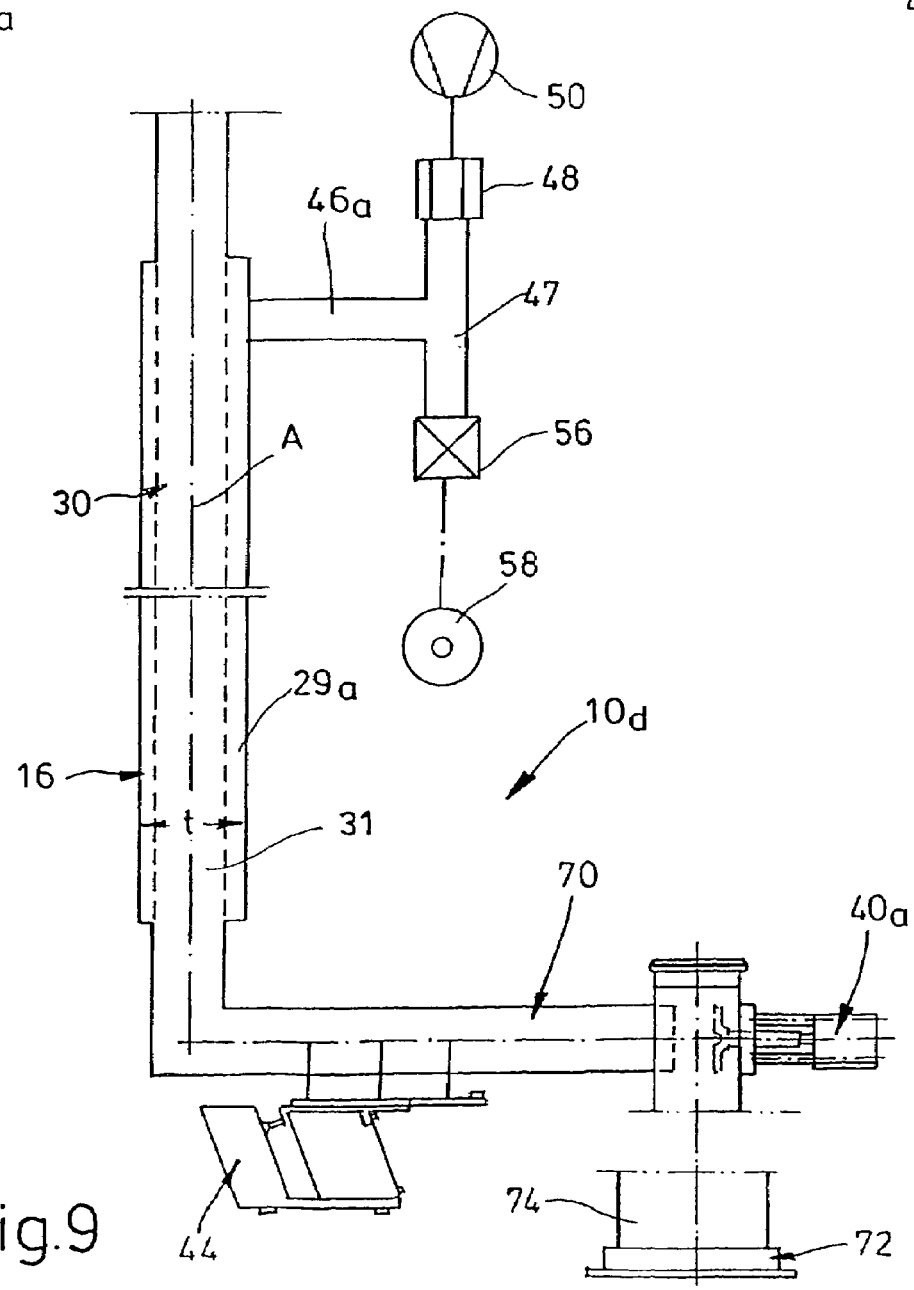

DEVICE AND METHOD FOR TRANSFERRING A DUSTY POWDERY GRAIN-LIKE OR GRANULAR CONVEYED MATERIAL OUT OF A STORAGE RECEPTACLE AND INTO A WORKING OR TRANSFER RECEPTACLE OR A SIMILAR ACCOMODATING SPACE

BACKGROUND OF THE INVENTION

The invention relates to an apparatus for conveying a particulate material into a receiving space and also relates to a conveying method.

One known apparatus of this type has a receiving container with a conical bottom area at the discharge cross section—which can be closed by means of a flap. Opposite said discharge cross section, there is an air feed in the container head, a series of filter bags being mounted upstream of said air feed in the direction of the container space.

Such pneumatic conveying devices are currently used primarily in the chemical and pharmaceutical industry, in the foodstuffs industry and other sectors of industry in which powder-like materials have to be conveyed. The great advantage of this conveying system is that it makes it possible to convey these substances in a controlled atmosphere. The known systems and devices for conveying powder-like materials and bulk materials are in most cases matched in terms of the design to the product that is to be conveyed, which is why these systems are often produced on a one-off basis; as a result, the costs of such systems—which operate relatively slowly and can only be cleaned with difficulty—are relatively high.

A further—very significant—problem with known systems is the clogging of the filter after a relatively short operating time, as a result of which disruptions often occur in the production of the powder-like materials and these disruptions lead to greater costs on account of stoppages in production.

BE 658 419 discloses a precipitation apparatus for precipitating solid material from the air stream of a pneumatic suction conveying system. A perforated piece of tube is used as filter device for the precipitation of the solid material. The air suction may be interrupted by a flap so that the granules adhering to the piece of tube can automatically fall down. The perforated piece of tube has relatively large pores and is rigid per se.

DE 196 54 648 A1 discloses a precipitation apparatus for the precipitation of powder-like materials having a small particle size from a stream of air. The solids/air mixture is passed into a separating chamber through a side entry opening. At the upper end of the longitudinal separating chamber there is a round filter which in terms of its particle size is suitable for retaining the solids. On the underside of the separating chamber there is a discharge opening.

It is the object of the present invention to eliminate the problems that occur with the systems and apparatuses described above, and to provide a conveying system which is suitable for different conveyed materials.

SUMMARY OF THE INVENTION

The foregoing object is achieved by providing an apparatus comprising a working chamber connected to a supply line for the conveyed material and having a discharge cross section, where at least one feed line for a flow medium opens into the working chamber and a filter device is arranged between said feed line and the conveyed material, wherein the supply line for the conveyed material opens into a filter space and a filter insert that delimits the latter is arranged in the working chamber, said working chamber being connected to an air line and/or a gas line.

According to the invention, the supply line for the conveyed material opens into a tubular space, and a filter insert that delimits the latter and is also tubular is arranged in the working chamber which is connected to an air line and/or a gas line.

In this case, the working chamber for receiving the filter insert comprises a perforated inner tube, which inner tube delimits a gap with a housing that surrounds said working chamber; the longitudinal axis of the housing of the working chamber should in addition determine the axial position of the filter insert and/or of the inner tube. It has been found that by virtue of the concept of a filter tube in the working chamber it is possible to considerably improve both the conveying operation and the cleaning works to be carried out on the apparatus.

Advantageously, the inner tube is spanned by a top cover of the filter insert, where this top cover is connected to a top plate of the surrounding housing by at least one fixing device; top cover and top plate delimit a head space which adjoins the gap between housing and filter insert, which head space is separated from the filter space of the filter insert by the top plate.

In one preferred refinement, the top cover bears the filter insert, which remains tensible on account of this suspension; according to the invention, in this refinement at least the height of the head space is variable. In addition, the top cover and the top plate should be connected by the supply line passing through them, in particular by a socket piece. According to the invention, this axial socket piece passes through the top plate—in a manner such that it can slide therein—and is connected to the supply line; preferably, the socket piece runs as a section of the supply line in the head space and is provided with an inlet valve which stops the pressure against the inlet direction.

It has additionally been found to be favorable to design the working space such that it can be connected to a vacuum source, preferably to the abovementioned head space. In one refinement, the vacuum source and a gas source, with the intermediate connection of a valve, should have a common outlet pipe for the working chamber, which may optionally be subjected to the action thereof. The vacuum serves to suck in the conveyed material and the selected flow medium—that is to say air or gas—in the working chamber washes round the filter insert located therein, penetrates into the interior thereof and conveys away the conveyed material located therein. For this purpose, an inlet valve should be arranged upstream of said valve in a gas line of the gas source.

In a further configuration, it has been found to be favorable to provide the vacuum source with a valve and to connect the latter by a line to the inlet valve of a gas source; this line should be designed as a T-piece having an outlet pipe associated with the working chamber, which outlet pipe is connected to the head space of the working chamber.

Vibration members which project from the housing in the direction of the axis are particularly important, said vibration members being connected to the inner tube and/or the filter insert and preferably operating at a frequency of between 20 and 150 Hz. By virtue of these vibrators—which in one preferred refinement are connected to the fixing device for the filter insert—an improvement is obtained both in the conveying operation and in the cleaning of the filter.

According to another feature of the invention, the filter space is designed at its lower outlet end such that it can be closed—by means of a closure member; this outlet end is conventionally provided at the base of the filter space but in the case of a horizontal arrangement of the filter space may also in turn be horizontal. This closure member may be a flap valve, a butterfly valve, a slide valve or a ball valve, where appropriate also a multichamber sluice. In any case, this closure member may be used to determine the filling level of the filter space and to initiate the conveying-away operation.

A filter space having at its lower end a bottom opening of the housing surrounding the working chamber is preferred; this bottom opening is designed such that it can be closed by means of the abovementioned closure member.

In one embodiment, the bottom opening may be provided in the cover plate of a container that is associated with the housing. According to a further feature of the invention, a motor-driven sluice device may also be provided on the lower side of the filter space for the step-by-step transfer of the conveyed material into a closed receiving container, which motor-driven sluice device can optionally be rotated and is provided with a number of metering chambers, one of which in each case can be placed in front of the discharge cross section of the filter space.

Within the context of the invention there is additionally an apparatus the filter space of which on the discharge side opens into a vibration channel which at the other end is provided with a closure member. A container provided with a weighing element is preferably arranged downstream of the latter.

According to the invention, the filter insert is of round, triangular or polygonal cross-sectional shape. The same also applies in respect of the inner tube, where the cross sections of the two components do not have to coincide. Nevertheless, it has proven to be favorable to allow the cross-sectional shape of the filter insert to correspond to the cross-sectional shape of the inner tube that surrounds it. It is also advantageous if the surface of the filter insert corresponds to at least two thirds of the cross-sectional area of the inner tube. A further feature of the invention specifies that the perforated inner tube has round, triangular and/or polygonal holes or is made of a wire netting.

The following measures are specified in particular according to the invention: a diameter of the filter tube of between 5 mm and 1000 mm, preferably between 200 mm and 900 mm, 100 mm and 600 mm or between 10 mm and 150 mm, and a length of the filter tube of between 25 mm and 5000 mm, advantageously between 1000 mm and 4500 mm or between 500 mm and 3000 mm or between 50 mm and 600 mm.

Within the context of the invention there is also a method for transferring a dust-like, powder-like, grain-like or granule-like conveyed material, in which the conveyed material is sucked up by a vacuum and/or the filter tube is cleaned by overpressure.

Overall, this results in an efficient solution to the problems mentioned in the introduction.

BRIEF DESCRIPTION OF THE DRAWINGS

Further advantages, features and details of the invention emerge from the following description of preferred examples of embodiments and with reference to the drawing, in which:

FIGS. 8, 9 show in each case a schematic side view of a particular arrangement of the filter tube.

DETAILED DESCRIPTION

Figure 1:
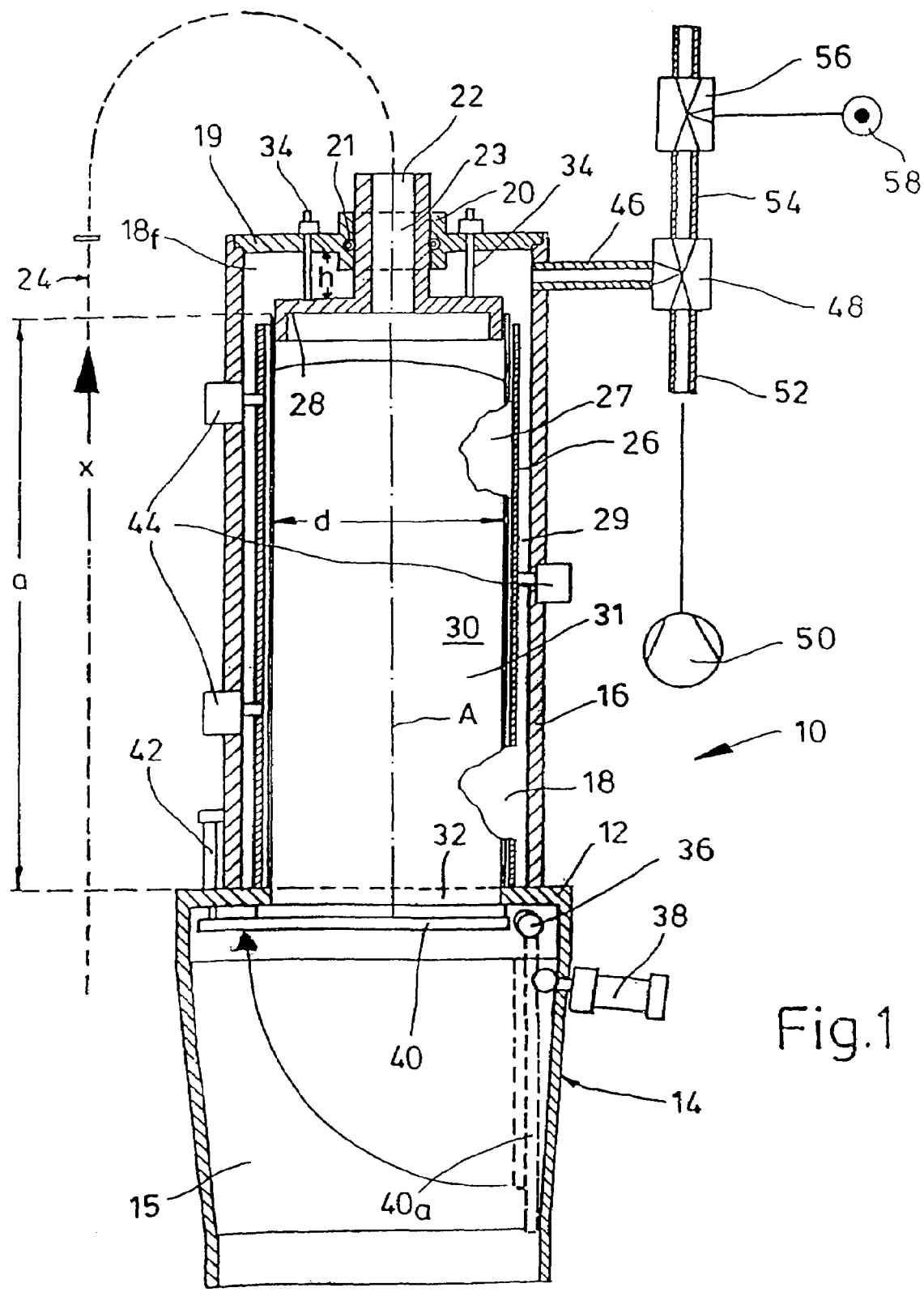
FIGS. 1 to 3 show in each case a longitudinal section through an apparatus according to the invention.

An apparatus 10 according to the invention for transferring dust-like, powder-like, grain-like or granule-like substances as conveyed material according to FIG. 1 has, on a cover plate 12 of a receiving container 14 that forms a base, a tubular housing 16 of a working chamber 18, which is spanned toward the top by a top plate 19. Said top plate is in the tube axis A passed through by a short socket piece 22 which may comprise an inlet valve 23 and which is gripped by a collar 20 of the top plate 19—with the intermediate connection of a sealing ring 21. At the socket piece 22, a conveying line indicated at 24—for conveyed material flowing in the arrow direction x—is connected to a perforated inner tube that is fitted in the working chamber 18; this inner tube delimits a gap 29 with said housing 16.

The socket piece 22 opens at a top cover 28 of a tubular filter insert 30 which runs coaxially in the interior 27 of the inner tube 26. The top cover 28 is suspended in the working chamber 18 by a fixing device 34 that extends between it and the top plate 19, and the working chamber ends on the cover plate 12 of the receiving container 14, which cover plate bears both the inner tube 26 and the housing 16 of the working chamber 18. Toward the interior 15 of the receiving container, the cover plate 12 is provided with a bottom opening 32 as a discharge opening, which is surrounded by the tubular filter insert 30 and the inner tube 26.

A flap valve 40 which is articulated in a pivotable manner at the bearing point 36 is associated with the bottom opening 32, which flap valve is moved by means of a piston/cylinder unit 38 from a rest position shown at $40_a$ into its closed position in which it covers the bottom opening 32 from below. A closure piston 42 which supplies the necessary closing pressure in the closed position in this case passes through the cover plate 12 toward the flap valve 40.

Vibrators 44 (three of which can be seen in FIG. 1) are fitted in the housing 16, which vibrators act in a vibrating manner on the inner tube 26 and the filter insert 30. It is not shown that the vibrators 44 by way of example may also act on the abovementioned fixing device 34 for the filter insert (30).

The head section $18_f$ of the working chamber 18, which is delimited by the top plate 19 and the top cover 28 and can be adjusted to a limited extent in terms of its height h, is connected by a radial connection piece 46 to a valve 48, which is arranged between a vacuum line 52—coming from a vacuum pump 50- and a gas line 54; the latter comprises an inlet valve 56 which for its part is connected to a control member 58 for the purpose of controlling the gas pressure.

On account of the negative pressure generated by the vacuum pump 48, the conveyed material is sucked up via the supply line 24 and introduced into the working chamber 18. During this operation—or during emptying—the filter tube 30 inserted into the perforated inner tube 26 is made to oscillate by means of the vibrators 44, which operate at a frequency of from 20 to 150 Hz, and thus adhesion of the powder-like material is avoided. The vibrators 44 are primarily used to clean the filter tube 30 or to keep the latter clean.

Thereafter, air is introduced into the working chamber 18 via the valve 48 and the conveyed material is discharged via the flap valve 40. Depending on the product that is to be conveyed, the latter may be replaced by a butterfly valve, slide valve, ball valve or a multichamber sluice or the like. The filter tube 30 is cleaned by the air entering through the valve 48 or by compressed air or gas. During the cleaning operation, the filter insert or the filter tube 30 is kept in oscillation via the vibrators 44.

Figure 2:
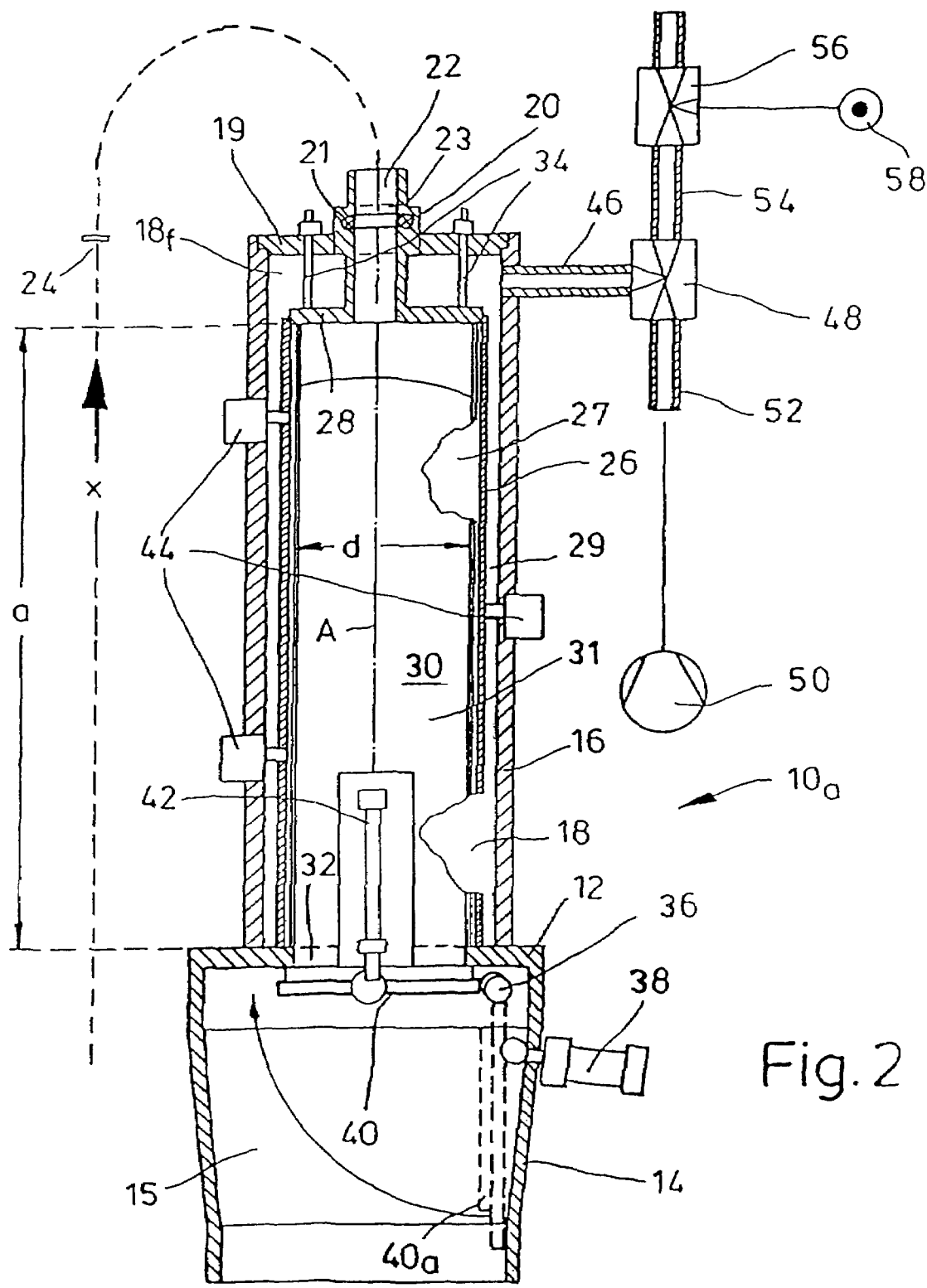

The apparatus 10$_a$ of FIG. 2 differs from the abovementioned apparatus 10 firstly by the position of the closing piston 42 for the flap valve 40; this is arranged in the interior 27 of the perforated inner tube 26. Secondly, the cleaning of the filter tube 30 in this case takes place by vibration or air; the valve 48 is not connected to the gas line 52.

Figure 3:
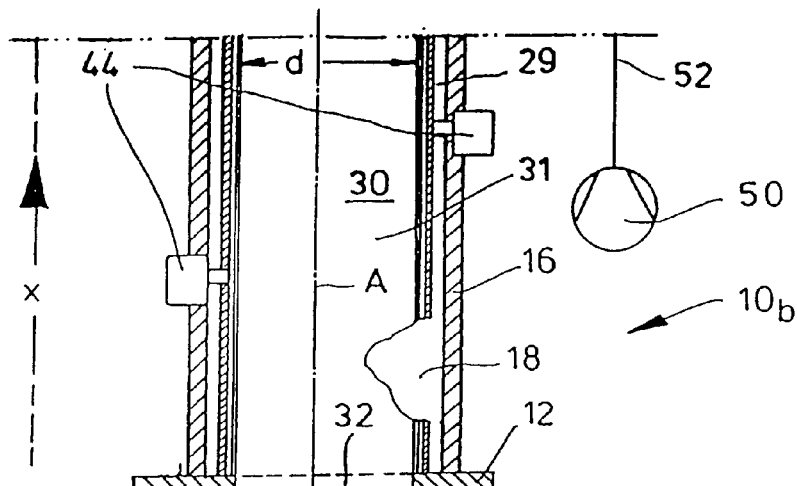

Above the bottom opening 32, the apparatus 10$_b$ of FIG. 3 corresponds to the apparatus 10 of FIG. 1. Below the bottom opening 32, there is a base 60 which is funnel-shaped in cross section and which merges into a sluice device 62 with motor-driven sluice wheel 64; the latter has eight metering chambers 66. There is a discharge 68 below this sluice wheel 64.

Figure 4:
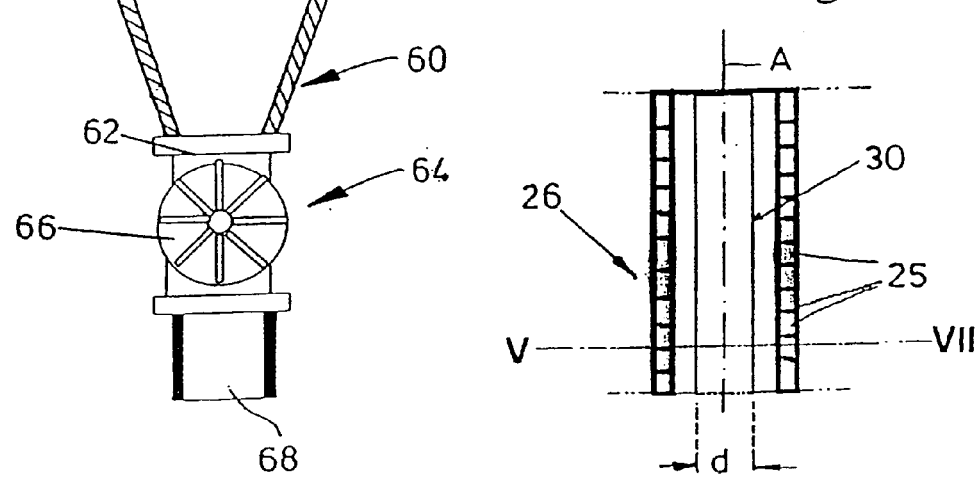
FIG. 4 shows a perforated tube with inserted tubular filter in longitudinal section as a detail of the apparatus.

FIG. 4 mainly shows the perforation of the inner tube 26; the latter is provided with round, rectangular or polygonal wall holes 25. However, it may also be composed of a wire netting (not shown).

Figure 5:
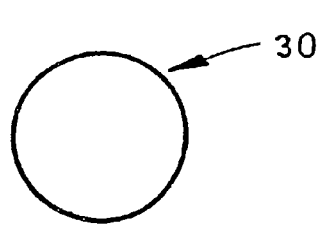
FIGS. 5 to 7 schematically show cross-sectional shapes on line V-VII of FIG. 4 for a filter tube.
Figure 6:
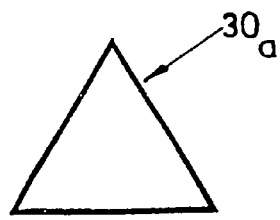
Figure 7:
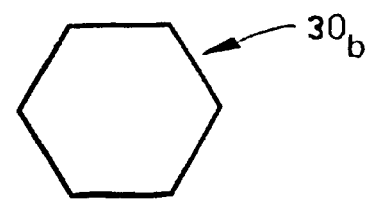

FIGS. 5 to 7 show cross-sectional variations of the filter tube 30, 30$_a$, 30$_b$, namely a cylindrical cross section, a triangular cross section and a hexagonal or polygonal cross section.

In FIG. 8, a filter tube 30 having a diameter d of 80 mm and a length a of 800 mm is used on an apparatus 10$_e$ in a horizontal position between a socket piece 22$_a$ and a flap valve 40$_a$. The radial connection piece 46$_a$ which in this case points upward from the housing 16, as part of a T-piece 47, connects the filter tube 30 on the one hand to the inlet valve 56 on the control member 58 and on the other hand to the valve 48 in front of the vacuum pump 50. The use of this arrangement is explained in more detail in Example 6 below.

The filter tube 30 of FIG. 9 projects in the housing 16 of a diameter t vertically from a vibration channel 70 of the apparatus 10$_d$, which at the other end is connected to a flap valve 40$_a$ and on the underside is provided with an electrically driven vibrator 44. Below this flap valve 40, a container 74 is arranged on a balance 72, the function of which container can be seen from Example 7 below; a number of application examples are described below.

EXAMPLE 1

Under hermetically sealed conditions, the very fine residuary powder was to be transferred from the receiving container of an electrostatic spraying system into transport containers (big bags) in order to be transported away. The mean particle size was 1 μm and the bulk density was 300 g/lt.

The filter tube 30 of the system had a diameter d of 250 mm and a length a of 1000 mm. Using this system, 800 kg were transferred in 20 min.

EXAMPLE 2

A pharmaceutical powder having a mean particle size of 25 μm and a bulk density of 600 g/lt was to be transferred from a hopper into a mixer.

The hopper, having a capacity of 200 l, from which the powder was taken and transferred into the mixer, was arranged at a distance of 10 m. The apparatus according to the invention for conveying the powder was fitted on the input flange of the mixer having a diameter of 150 mm.

A system according to the invention, with a filter tube 30 having a diameter d of 100 mm and a length a of 400 mm, was used for the transfer.

The amount conveyed to the mixer was 40 kg in 4 min.

EXAMPLE 3

In a mill, the air (200 m$^3$/h) was very highly enriched with very fine powder having a particle size of 0.5 to 1.5 μm.

A system with a filter tube 30 having a diameter d of 250 mm and a length a of 500 mm was used to clean the air. The powder-enriched air was let into the filter tube 30 via the line 24, which was fitted with a turbofan having a capacity of 200 l which generated the negative pressure.

The air could thus be kept dust-free.

EXAMPLE 4

A silo for 100 t of flour was to be filled at a conveying rate of 25 t/h. The filling level was 12 m.

Using a system which had a filter tube 30 having a diameter d of 1.2 m and a length a of 2 m and which was provided to suck using a turbocompressor at a rate of 2000 N/m$^3$/h, the necessary conveying rate was readily achieved.

EXAMPLE 5

A powder-like material was to be transferred from a transport container (big bag) having a capacity of 1 t to a metering device which for the purpose of metering into the inlet hopper was equipped with a level control device, metering worm and a weighing system and was arranged at a distance of 12 m. In order to avoid disruptions for the weighing device, the inlet hopper was filled when the weighing system was in the switched-off state.

The apparatus according to the invention which was used for the transfer had a filter tube 30 having a diameter d of 100 mm and a length a of 500 mm.

The amount of powder transferred was 500 kg/h.

EXAMPLE 6

A relatively large amount of calcium carbonate (1 t/h) was to be transported from a silo over a distance of 100 mm to the place of use. In order to convey this amount, the horizontally running filter tube 30 of FIG. 8 was used. The mode of operation for the sucking up of the powder corresponded to that described below with reference to Example 7, where the powder was discharged over the extent by means of pressure supplied via the inlet valve 56.

EXAMPLE 7

In order to convey and meter a powder-like material for the pharmaceutical industry, a filter tube 30 with a filter insert having a diameter d of 60 mm and a length a of 600 mm was fitted in the working chamber 16 as shown in FIG. 9. The amounts to be metered were between 500 g and 5000 g with an accuracy of ±1 g.

The position of the essential elements at the start of the metering process was as follows:
socket piece 22 open;
outlet valve 40 closed;
valve 48 open;
inlet valve 56 closed.

By opening the valve 48 to the vacuum pump 50, in this case the powder that was to be metered was sucked up via the socket piece 22 and the tubular chamber $29_a$ was filled. The inlet valve 56 was then opened, the tubular chamber $29_a$ was ventilated and the powder that was to be metered was discharged via the vibration channel 70 through the vibrator 44 and the outlet valve 40 into the container 74 arranged on the balance 72. The outlet valve 40 was controlled via the balance 72. Thereafter the valves $40_a$, 48, 56 were automatically returned to their initial position.

The invention claimed is:

1. An apparatus for transferring a dust-like, powder-like, grain-like or granule-like conveyed material from a storage container into a working or transfer container or similar receiving space, said apparatus comprising a working chamber (18) connected to a supply line (24) for the conveyed material and having a discharge cross section, where at least one feed line (46) for a flow medium opens into the working chamber (18) and a filter device is arranged between said feed line and the conveyed material, wherein the supply line (24) for the conveyed material opens into a filter space (31) and a filter insert (30) that delimits the latter is arranged in the working chamber (18), said working chamber being connected to an air line (52) and/or a gas line (54), wherein the working chamber (18) for receiving the filter insert (30) comprises a perforated inner tube (26), which inner tube defines a gap (29) with a housing (16) that delimits the working chamber and wherein a top cover (28) of the filter insert (30) is connected to a top plate (19) of the housing (16) by at least one fixing device (34), where the top plate separates a head space ($18_f$), which adjoins the gap (27), from the filter space (31) of the filter insert (30).

2. An apparatus for transferring a dust-like, powder-like, grain-like or granule-like conveyed material from a storage container into a working or transfer container or similar receiving space, said apparatus comprising a working chamber (18) connected to a supply line (24) for the conveyed material and having a discharge cross section, where at least one feed line (46) for a flow medium opens into the working chamber (18) and a filter device is arranged between said feed line and the conveyed material, wherein the supply line (24) for the conveyed material opens into a filter space (31) and a filter insert (30) that delimits the latter is arranged in the working chamber (18), said working chamber being connected to an air line (52) and/or a gas line (54), the working chamber (18) is connected to a vacuum source (50), wherein the vacuum source (50) and a gas source, with an intermediate connection of a valve (48), have a common outlet pipe (46, $46_a$) for the working chamber (18), and wherein an inlet valve (56) is arranged upstream of the valve (48) in a gas line (54) of the gas source.

3. The apparatus as claimed in claim 2, wherein the working chamber (18) for receiving the filter insert (30) comprises a perforated inner tube (26), which inner tube defines a gap (29) with a housing (16) that delimits the working chamber.

4. The apparatus as claimed in claim 1 or 3, wherein the housing has a longitudinal axis (A) which determines the axial position of the filter insert (30) and/or of the inner tube (26).

5. The apparatus as claimed in claim 3, wherein a top cover (28) of the filter insert (30) is connected to a top plate (19) of the housing (16) by at least one fixing device (34), where the top plate separates a head space ($18_f$), which adjoins the gap (27), from the filter space (31) of the filter insert (30).

6. The apparatus as claimed in claim 5, wherein the head space ($18_f$) has a height (h) which is variable.

7. The apparatus as claimed in claim 5, wherein the top cover (28) and the top plate (19) are connected by the supply line (24) passing through them.

8. The apparatus as claimed in claim 7, wherein a socket piece (22) forms a section of the supply line (24) between the top cover (28) and the top plate (19) and is provided with an inlet valve (23).

9. The apparatus as claimed in claim 8, wherein the socket piece (22, $22_a$) adjoins the filter space (31) of the filter insert (30), which socket piece is connected on the other side to the supply line (24).

10. The apparatus as claimed in claim 9, wherein the socket piece (22, $22_a$) is connected to the top cover (28) of the filter insert (30) and passes through the top plate (19) of the housing (16), in which it bears in a sealing manner by way of at least one sealing ring (21).

11. The apparatus as claimed in claim 8, wherein the socket piece (22) provided with the inlet valve (23) runs as a section of the supply line (24) in the head space ($18_f$).

12. The apparatus as claimed in claim 1, wherein the working chamber (18) is connected to a vacuum source (50).

13. The apparatus as claimed in claim 12, wherein vacuum source (50) and a gas source, with an intermediate connection of a valve (48), have a common outlet pipe (46, $46_a$) for the working chamber (18).

14. The apparatus as claimed in claim 13, wherein an inlet valve (56) is arranged upstream of the valve (48) in a gas line (54) of the gas source.

15. The apparatus as claimed in claim 12 or 2, wherein the vacuum source (50) is provided with a valve (48) and the latter is connected by a line (47) to an inlet valve (56) of a gas source, wherein the line is designed as a T-piece having an outlet pipe ($46_a$) associated with the working chamber (18).

16. The apparatus as claimed in claim 15, wherein the outlet pipe (46, $46_a$) is connected to a head space ($18_f$) of the working chamber (18).

17. The apparatus as claimed in claim 5, wherein vibration members (44) are associated with the inner tube (26) and/or the filter insert (30), wherein the vibration members bear against the housing (16).

18. The apparatus as claimed in claim 17, wherein the vibration members are (44) arranged on the fixing device (34) for the filter insert (30).

19. The apparatus as claimed in claim 17, wherein the vibration members (44) have a frequency of between 20 and 150 Hz.

20. The apparatus as claimed in claim 5, wherein the filter space (31) is provided with a closure member (40, $40_a$).

21. The apparatus as claimed in claim 1 or 2, wherein the filter space (31) at a lower end is associated with a bottom opening (32) of the housing (16) which surrounds the working chamber (18), and the bottom opening is designed such that it can be closed by means of a closure member (40).

22. The apparatus as claimed in claim 21, wherein the bottom opening (32) is provided in a cover plate (12) of a container (14, 60) that is associated with the housing (16).

23. The apparatus as claimed in claim 21, wherein a sluice device (62) is arranged in the bottom opening (32) for the step-by-step transfer of the conveyed material into a closed receiving container.

24. The apparatus as claimed in claim 23, wherein the sluice device (62) comprises a rotatable sluice wheel which is provided with a plurality of metering chambers (66).

25. The apparatus as claimed in claim 20, wherein the filter space (31) opens into a vibration channel (70) which is provided with a closure member ($40_a$).

26. The apparatus as claimed in claim 25, wherein a container (74) provided with a weighing element (72) is arranged downstream of the closure member ($40_a$).

27. The apparatus as claimed in claim 26, wherein a valve forms the closure member (40, $40_a$) for the filter space (31).

28. The apparatus as claimed in claim 27, wherein the valve is one of a flap valve, a butterfly valve, a ball valve, and a slide valve.

29. The apparatus as claimed in claim 1 or 2, wherein the filter insert (30) is one of round, triangular and polygonal in cross-sectional shape.

30. The apparatus as claimed in claim 29, wherein the inner tube (26) is one of round, triangular and polygonal in cross section.

31. The apparatus as claimed in claim 30, wherein the cross-sectional shape of the filter insert (30) corresponds to the cross-sectional shape of the inner tube (26).

32. The apparatus as claimed in claim 31, wherein the inner tube (26) has one of round, triangular and polygonal holes (25).

33. The apparatus as claimed in claim 3, wherein the inner tube (26) is made of a wire netting.

34. The apparatus as claimed in claim 3, wherein the surface of the filter insert (30) corresponds to at least two thirds of the cross-sectional area of the inner tube (26).

35. The apparatus as claimed in claim 1 or 2, wherein the filter insert has a diameter (d) of is between 5 mm and 1000 mm.

36. The apparatus as claimed in claim 35, wherein the diameter (d) is between 10 mm and 600 mm.

37. The apparatus as claimed in claim 35, wherein the filter insert has a the length (a) of is between 25 mm and 5000 mm.

38. The apparatus as claimed in claim 37, wherein the length (a) is between 500 mm and 3000 mm.

39. A method for transferring a dust-like, powder-like, grain-like or granule-like conveyed material using the apparatus (10, $10_a$, $10_b$) as claimed in claim 1 or 2, comprising sucking up the conveyed material by vacuum.

40. The method as claimed in claim 39, including cleaning the filter tube (30) by overpressure.

* * * * *